United States Patent [19]

Cantrell, Jr. et al.

[11] 4,310,906
[45] Jan. 12, 1982

[54] LIQUID-IMMERSIBLE ELECTROSTATIC ULTRASONIC TRANSDUCER

[75] Inventors: John H. Cantrell, Jr., Newport News; Joseph S. Heyman, Gloucester; William T. Yost, Emory, all of Va.; Michael A. Torbett, Lirona, Mich.; Mack A. Breazeale, Knoxville, Tenn.

[73] Assignee: The United States of America as represented by the Administrator, National Aeronautics and Space Administration, Washington, D.C.

[21] Appl. No.: 106,136

[22] Filed: Dec. 21, 1979

[51] Int. Cl.³ .............................................. H04R 19/00
[52] U.S. Cl. .................................... 367/181; 73/724; 361/283
[58] Field of Search ................... 367/181; 73/718, 724; 361/283

[56] References Cited

U.S. PATENT DOCUMENTS 3,222,581 12/1965 Lenfant .............................. 73/724
3,418,546 12/1968 Beavers et al. ..................... 361/283

Primary Examiner—Theodore M. Blum
Attorney, Agent, or Firm—William H. King; John R. Manning; Howard J. Osborn

[57] ABSTRACT

A broadband megahertz range electrostatic acoustic transducer for use in a liquid environment. A liquid-tight enclosure 11 which includes a metallic conducting membrane 18 as part of its outside surface has a means 19 inside the liquid-tight enclosure for applying a tension to the membrane and for mounting an electrode 23 such that the flat end of the electrode is approximately parallel to the membrane. The invention includes structure and a method for ensuring that the membrane 18 and the flat end of the electrode 23 are exactly parallel and a fixed predetermined distance from each other.

14 Claims, 3 Drawing Figures

LIQUID-IMMERSIBLE ELECTROSTATIC ULTRASONIC TRANSDUCER

ORIGIN OF THE INVENTION

The invention described herein was made by students and an employee of the University of Tennessee, Knoxville, Tenn., and employees of the United States Government and may be manufactured and used by or for the Government for governmental purposes without the payment of any royalties thereon or therefor.

BACKGROUND OF THE INVENTION

The invention relates generally to transducers and more specifically concerns a broadband capacitive electrostatic acoustic transducer for ultrasonic measurements in liquids.

Capacitive transducers have been used in the past for ultrasonic measurements in solids (Gauster and Breazeale, The Review of Scientific Instruments, Volume 11, pages 1554–1548, 1966; Cantrell and Breazeale, Journal of the Acoustic Society of America, Volume 61, pages 403–406, 1977). However, neither these nor any other known transducer is suitable for making absolute amplitude ultrasonic measurements in a liquid environment.

It is therefore an object of this invention to provide a capacitive transducer suitable for making absolute amplitude ultrasonic measurements in a liquid environment.

To effectively use a capacitive transducer to make ultrasonic measurements the transducer must be very sensitive. To achieve this high sensitivity it is necessary that the gap between the capacitor plates be extremely small and that the two capacitor plates be as parallel as possible.

Another object of this invention is to provide a method and apparatus for making the two plates of a capacitive transducer parallel and a fixed small distance from each other with a high degree of exactness.

A further object of this invention is to provide a means for applying tension to a membrane capacitive plate to aid in making the two capacitive plates of a capacitive transducer flat and parallel.

Other objects and advantages of this invention will become apparent hereinafter and in the drawings.

SUMMARY OF THE INVENTION

The invention includes a liquid-tight enclosure with a part of its outside surface formed by a conductive membrane. An electrode having a flat end is mounted inside the enclosure such that its flat end is approximately parallel to the conductive membrane thereby forming a capacitor. Means are provided inside the enclosure for mounting the membrane and for applying a tension to the membrane thereby removing any wrinkles in the membrane and making it flat.

To ensure that the flat end of the electrode is as nearly parallel with the membrane as possible, the membrane is temporarily removed from its mounting means. Then the electrode is spaced from its mounting means such that it extends through the plane of the opening left by the removal of the membrane. Thereafter the electrode is lapped off and polished even with the uppermost surface of the membrane mounting means. The electrode is again mounted on its mounting means in its permanent position and the membrane is remounted thereby assuring parallelism between the membrane and the electrode with a high degree of exactness.

DETAILED DESCRIPTION OF THE INVENTION

Figure 1:
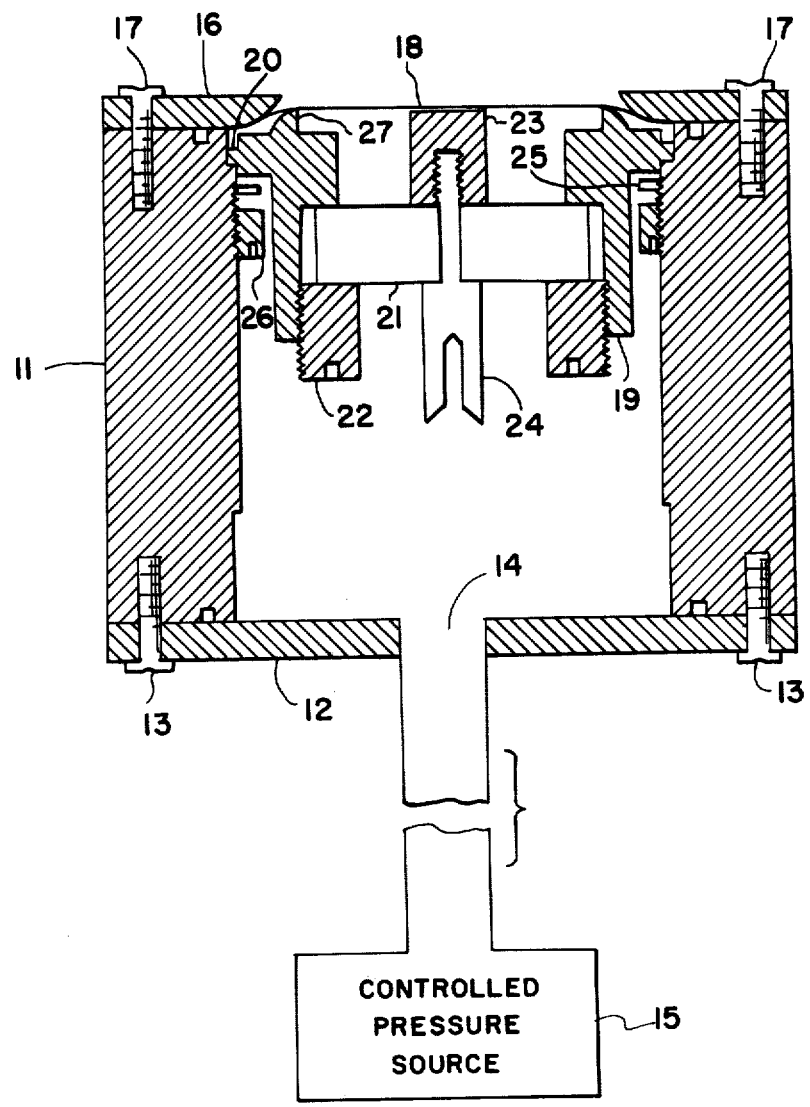
FIG. 1 is a sectional schematic drawing of the embodiment of the invention selected for illustration in the drawings.

Turning now to the embodiment of the invention selected for illustration in the drawings the number 11 in FIG. 1 designates a cylindrical housing made from an electrically conductive material such as, for example, brass. An electrically conductive plate 12 is attached to one end of the cylindrical housing 11 by means of screws 13 to enclose that end of the housing. An opening 14 in plate 12 is connected to a controlled pressure source 15, such as for example a bellows, to control the pressure inside the housing. An electrically conductive retainer ring 16 is attached to the other end of the cylindrical housing 11 by means of screws 17. An electrically conductive membrane 18 approximately 11 $\mu$m thick covers the opening left by retainer ring 16 thereby completing a liquid-tight enclosure. A slide assembly 19, located inside housing 1, fits into a slot 20 which allows movement of the slide assembly in the axial direction only. That is, slot 20 does not allow rotation of the slide assembly. An insulator 21 is mounted on the slide assembly 19 by means of a holding collar 22 which is threaded to the slide assembly. A cylindrical electrode 23 is mounted on the insulator 21 by a suitable fitting 24 that has male screw threads which extend through insulator 21 and mates with female screw threads in electrode 23. A washer 25 is fitted inside the housing 11 against the slide assembly 22. A tensioning ring 26 which is threaded to housing 11 pushes washer 25 and slide assembly 19 upward in the axial direction. Slide assembly 19 has a protruding annular lip 27 which is pressed against membrane 18 thereby putting a tension on membrane 18 as it is pressed against retainer ring 16. Inasmuch as slide assembly 19 can move only in the axial direction there will be no rotational movement of the slide assembly which could cause wrinkles in membrane 18. It is only necessary that enough tension is put on the membrane to remove all wrinkles; however, if more tension is put on the membrane no difference in operation of the transducer will result. The operation of the transducer is independent of the stress or strain on membrane 18.

To ensure that the flat end of electrode 23 is parallel to and is a fixed distance of approximately 10 $\mu$m from membrane 18 the membrane is removed. Then electrode 23 is removed from fitting 24 and a 10 $\mu$m thick spacer is placed on top of insulator 21. Electrode 23 is again attached to fitting 24. Consequently, due to the extension of electrode 23 by the spacer, electrode 23 extends beyond the plane of the uppermost part of annular lip 27. Then the electrode 23 is lapped off by any conventional grinding and polishing means such that the flat end portion of the electrode 23 is in the same plane as the upper surface of annular lip 27. Thereafter, the spacer between electrode 23 and insulator 21 is removed, electrode 23 is screwed onto fitting 24 as shown and membrane 18 is replaced as shown. This process results in exact parallelism between electrode 23 and membrane 18, and also fixes the distance between the two to the thickness of the spacer.

Figure 2:
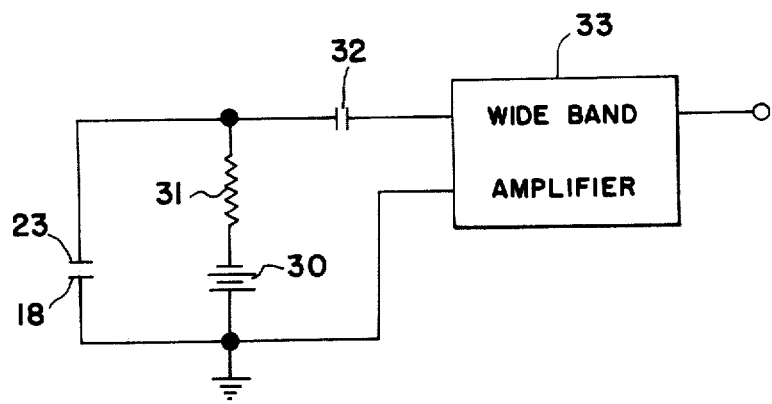
FIG. 2 is a schematic drawing of the electrical circuitry used to convert the changes in capacitance of the embodiment of the invention shown in FIG. 1 into a.c. signals.

The transducer as shown in FIG. 1 is connected in an electrical circuit for operation as shown in FIG. 2. A DC voltage source 30 is connected in series with a resistance 31 the combination of which is connected across electrode 23 and membrane 18 of the transducer. The positive or the negative terminal of the voltage source 30 and membrane 18 are connected to ground. Consequently, changes in capacitance between electrode 23 and membrane 18 are converted to changes in voltage at electrode 23. These changes in voltage are passed through a capacitor 32 to a wideband amplifier 33 the output which can be connected to any other circuitry desired. Capacitor 32 passes only voltage changes and hence does not allow the DC voltage at source 30 to pass through to the wideband amplifier 33.

Figure 3:
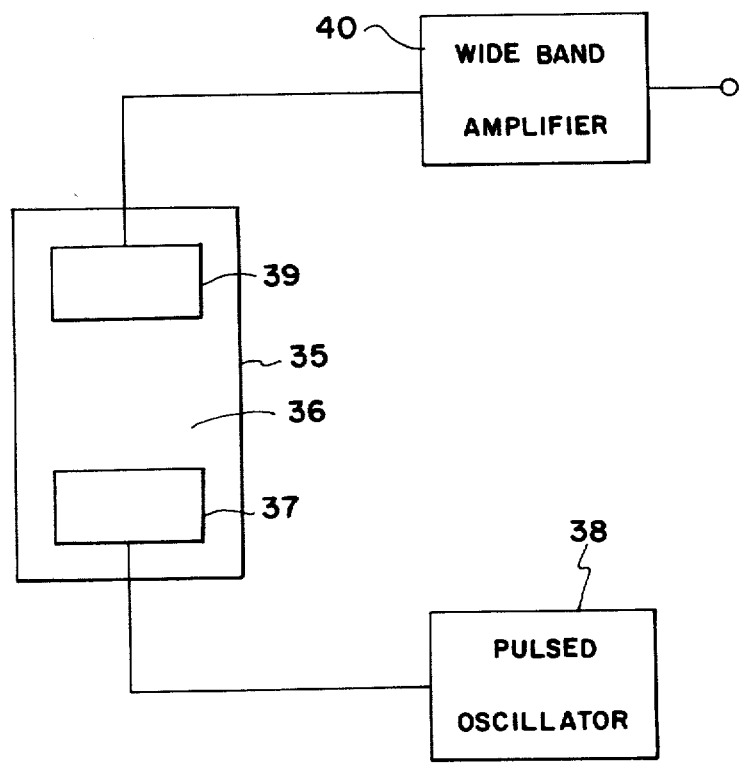
FIG. 3 is a block diagram showing how the capacitor transducer in FIG. 1 can be utilized.

The block diagram in FIG. 3 shows one way in which the transducer that constitutes this invention can be used. A container 35 contains a liquid 36. A piezoelectric transducer 37 is emerged in the liquid 36. A pulsed oscillator 38 supplies pulses to piezoelectric transducer 37 causing it to emit ultrasonic signals into the liquid 36. A transducer 39 which constitutes the present invention is also submerged in the liquid 36 and is connected to a wideband amplifier 40. The ultrasonic signal emitted by piezoelectric transducer 37 are detected by the transducer 39 and applied to the wideband amplifier 40. The output of amplifier 40 can then be analyzed to give an indication of the type of liquid 36.

These are obvious changes that can be made without departing from the spirit and scope of the invention. The device may be made from materials other than those indicated in the specification. The device may be of different geometry and sizes to accommodate specific situations. The device may be used as a transmitting transducer as well as receiving transducer and may be used in combination with other transducers. Initial capacitance (i.e., sensitivity) may be adjusted by any means (e.g., mechanical advancement, electromagnet, electrostatic, etc).

The advantage of this invention over the prior art is that it has a broadband megahertz range frequency response, has a known electroacoustic transfer function, is capable of measuring absolute displacement amplitudes of incident ultrasonic waves, and is immersible in liquids. Since it is the only transducer capable of measuring absolute displacement amplitudes of ultrasonic waves in liquid it may be used as a calibrator for other transducers and as a probe for the study and characterization of materials where absolute displacement amplitude is important.

We claim:

1. A broadband electrostatic acoustic transducer having a megahertz range frequency response comprising:
   a flat thin conductor;
   an enclosure including said flat thin conductor which forms a part of the outside surface of said enclosure;
   an electrode having a flat end;
   means for mounting said electrode inside said enclosure such that said flat end of said electrode is approximately parallel to said flat conductor; and
   means for temporarily extending said electrode from said mounting means a fixed predetermined distance in the direction of and beyond the inside surface of said flat conductor whereby with said flat thin conductor detached from said enclosure said electrode can be lapped off even with the inside surface of said enclosure whereby when said temporary extension is removed from said electrode and said flat thin conductor is replaced the flat thin conductor and the electrode form a capacitor with capacitor plates said predetermined distance apart and precisely parallel to each other.

2. A broadband electrostatic acoustic transducer according to claim 1 wherein said means for temporarily extending said electrode from said mounting means, is screw means for attaching said electrode to said mounting means whereby a spacer can be temporarily inserted between said electrode and said mounting means to extend the electrode.

3. A broadband electrostatic acoustic transducer according to claim 1 wherein said flat thin conductor is a membrane.

4. A broadband electrostatic acoustic transducer according to claim 3 wherein said means for mounting said electrode inside said enclosure is a slide assembly means which allows movement only in the direction perpendicular to said membrane with means on the slide assembly means for applying tension to said membrane.

5. A broadband electrostatic transducer according to claim 4 wherein said means applying tension to said membrane includes an annular lip on said slide assembly means that is pressed against said membrane.

6. A broadband electrostatic acoustic transducer according to claim 5 including a ring threaded to said enclosure for controlling the tension applied to said membrane.

7. A broadband electrostatic acoustic transducer according to claim 6 including means for varying the pressure inside said enclosure to fine control the spacing between said electrode and said membrane.

8. A broadband electrostatic acoustic transducer according to claim 1 including means for converting the varying capacitance produced by the transducer into a varying electrical signal.

9. A broadband electrostatic acoustic transducer according to claim 8 wherein said means for converting said varying capacitance into a varying electrical signal includes a direct current electrical source connected in parallel with said transducer and a capacitor for passing only the a.c. signals produced at one of the terminals of the transducer the other being connected to ground.

10. A broadband electrostatic acoustic transducer according to claim 1 wherein said enclosure is liquid-tight thereby allowing use in a liquid environment.

11. A method for ensuring that surfaces of a membrane and an electrode with a flat face that form a capacitor are a predetermined distance from and parallel to each other in which the membrane is initially mounted such that its capacitor forming surface is flush with a surface surrounding it and the electrode is initially mounted such that its capacitor forming surface is approximately parallel to the capacitor forming surface of the membrane comprising the steps of:
   removing said membrane from its mounting;
   remounting said electrode such that a space equal to said predetermined distance exists between said electrode and its initial mounting and such that said electrode extends beyond said surface surrounding the capacitor forming surface of the membrane;

removing the part of said electrode that extends beyond said surface surrounding the capacitor forming surface of the membrane; and remounting said membrane and said electrode on their initial mountings.

12. The method according to claim 11 whereby the step of removing part of said electrode includes polishing the resulting surface to a fine finish.

13. A broadband electrostatic acoustic transducer comprising:

a thin conductive membrane that is easily wrinkled and that is responsive to ultrasonic acoustic waves;

a housing that has an opening in it with said membrane covering said opening;

an electrode having a flat end;

a slide assembly located inside said housing with said electrode mounted thereon and parallel to said membrane;

means for mounting said slide assembly such that it can move only in the direction perpendicular to said opening and said membrane; and means on said housing and said slide assembly for applying tension to said membrane with the movement of said slide assembly whereby said membrane is flat with no wrinkles in it and said membrane and said electrode form a capacitor.

14. A broadband electrostatic acoustic transducer according to claim 13 wherein said housing is completely enclosed when said membrane is in its operating position and means for varying the pressure inside said enclosure to fine control the spacing between said electrode and said membrane.

* * * * *